United States Patent [19]

Yamada et al.

[11] Patent Number: 4,816,949
[45] Date of Patent: Mar. 28, 1989

[54] MAGNETIC HEAD CONTAINING AMORPHOUS ALLOY AND CRYSTALLIZABLE GLASS

[75] Inventors: Seiichi Yamada, Ibaraki; Takashi Naitoh, Hitachi; Takashi Namekawa, Hitachi; Akira Ikegami, Hitachi; Ryoo Gotoo, Mooka; Toshikazu Nishiyama, Fukaya, all of Japan

[73] Assignee: Hitachi, Ltd., Tokyo, Japan

[21] Appl. No.: 94,603

[22] Filed: Sep. 9, 1987

[30] Foreign Application Priority Data

Sep. 12, 1986 [JP] Japan .............................. 61-213899

[51] Int. Cl.$^4$ ........................................... G11B 5/251
[52] U.S. Cl. .................................. 360/120; 360/126; 501/76
[58] Field of Search ............... 360/110, 119, 120, 122, 360/125–127; 29/603; 501/15, 76

[56] References Cited

U.S. PATENT DOCUMENTS

| | | | |
|---|---|---|---|
| 3,485,648 | 12/1969 | Bishop | 501/76 |
| 3,639,976 | 2/1972 | Hoogendoorn et al. | 29/603 |
| 3,645,761 | 2/1972 | Kawamura et al. | 501/15 |
| 3,888,686 | 6/1975 | Ellis | 501/15 |
| 3,947,279 | 3/1976 | Hudecek | 501/76 F |
| 4,003,799 | 2/1977 | Dumesnil et al. | 501/15 X |
| 4,011,060 | 3/1977 | Berkenblit et al. | 501/76 X |
| 4,048,714 | 9/1977 | Huntt | 29/603 |
| 4,405,722 | 9/1983 | Kokubu et al. | 501/15 |
| 4,475,137 | 10/1984 | Yasuda et al. | 360/126 |
| 4,559,572 | 12/1985 | Kumasaka et al. | 360/110 |

FOREIGN PATENT DOCUMENTS

| | | | |
|---|---|---|---|
| 55-20265 | 2/1980 | Japan . | |
| 56-114117 | 9/1981 | Japan | 360/120 |
| 59-180817 | 10/1984 | Japan | 360/120 |
| 60-170008 | 9/1985 | Japan | 360/119 |
| 61-5406 | 1/1986 | Japan | 501/76 |

*Primary Examiner*—John H. Wolff
*Attorney, Agent, or Firm*—Antonelli, Terry & Wands

[57] ABSTRACT

The present invention relates to a magnetic head in which a magnetic metal film comprising a Co-containing amorphous alloy and a crystallizable glass of the $PbO$-$B_2O_3$-$ZnO$ system as a solder glass are used. The magnetic head of the present invention has about 2 times higher recording density than the conventional one as a magnetic head for floppy disks and hard disks because an amorphous alloy is used. Since a crystallizable glass is used as the glass, there can be obtained a magnetic head having a high strength and superior humidity resistance and reliability.

8 Claims, 3 Drawing Sheets

ⓐ GLASS OF THE PRESENT INVENTION
ⓑ GLASS OF COMPARATIVE EXAMPLE

MAGNETIC HEAD CONTAINING AMORPHOUS ALLOY AND CRYSTALLIZABLE GLASS

BACKGROUND OF THE INVENTION

1. Field of the Invention

The present invention relates to a magnetic head in which a magnetic metal film comprising a Co-containing amorphous alloy and a crystallizable glass of the $PbO$-$B_2O_3$-$ZnO$ system as a solder glass are used.

2. Description of the Prior Art

In recent years, floppy disk devices and hard disk devices used as an external memory of various computers have been advanced whereby such devices have become small and have obtained a high recording density. Therefore, a magnetic head, which can be viewed as the heart of the disk device, is also required to have a high performance, and hence a magnetic head has been developed in which a magnetic amorphous metal film (Co-Nb-Zr alloy) having a saturated magnetic density of high volume is used.

These magnetic heads are mainly formed with a head core, which is made of a magnetic material, and a ceramic slider, which is made of a non-magnetic material, by a joining technique with glass.

The joining process contains two steps which comprise a step wherein, after filling of glass to a magnetic head core, gaps of the head cores are joined to each other by glass, and a step wherein a head chip cut off from the head core are joined to a ceramic slider by glass.

In this case, the magnetic core is filled with glass at a temperature of about 420° C. (but 420° C. or below) and once the temperature is lowered naturally. Thereafter, the gaps of the head cores are joined to each other by glass at a temperature of 450° C. Furthermore, the head chip cut off from the head core is joined to the ceramic slider at a temperature of from exceeding 450° C. up to 460° C. by glass.

In this case, the magnetic amorphous metal film is crystallized when heated to the temperature of higher than 500° C., resulting in extreme deterioration of magnetic properties. Therefore, it is important to select the glass which is workable at a temperature of 500° C. or less and has a thermal expansion coefficient as near as possible to those of the head core and the ceramic slider in order that the magnetic head may not crack due to the difference of the thermal expansion caused by the temperature change in the construction procedures.

When an amorphous glass is used as the solder glass (abbreviated as glass A) for joining the gaps of the head cores, it is necessary to select a solder glass (abbreviated as glass B) for joining the head chip to the ceramic slider such that a glass B enables joining at a temperature lower than the softening temperature of glass A so that size distortion may not occur.

Thus, the softening temperatures of glass A and glass B must differ greatly. Moreover, a glass having a low softening temperature has a large thermal expansion coefficient and hence, the selection of glass is not easy.

On the other hand, though an adhesive such as an epoxy resin or the like is effective because it is workable at 300° C. or below and hence the magnetic amorphous metal film is not influenced, it is difficult to maintain very precise gaps thereby.

Under these circumstances, use of a crystallizable glass has been investigated as the glass A, and the glass is improved in thermal resistance by crystallization, whereby the working temperature of the glass B is elevated. That is, it is desired that the glass A has an elevated melting temperature when it is crystallized.

Thus, even if the working temperature of glass B is raised to the working temperature of glass A, the glass A which has been crystallized once is not melted at the initial working temperature, so that the glass A itself can be used as the glass B.

Further, an amorphous glass may of course be used as the glass B. In this case, it is preferable to select and use those fit for the thermal expansion coefficient of the glass A.

The joining of gaps of the head cores comprises bringing two cores in which their head core grooves have been filled with glass face to face and heating them to join them.

In the glass filling operation, it is impossible to join the cores when the glass is crystallized. Therefore, it is necessary to select as the glass A a crystallizable glass having characteristics such that it is not crystallized during the above-mentioned glass filling while it is crystallized at the core joining time.

Japanese Patent Application Kokai (Laid-Open) No. 20265/1980 discloses a sealing glass consisting of:

| | |
|---|---|
| PbO | 77~86 wt % |
| ZnO | 7~12 wt % |
| $B_2O_3$ | 7~11 wt % |
| $SiO_2$ | 1~3 wt % |

However, this glass composition is crystallized during the above-mentioned filling operation. Due to the crystallization, it is necessary to raise the working temperature for joining in the subsequent joining step higher than normally required. This is not preferable for joining the gaps of the magnetic head.

SUMMARY OF THE INVENTION

The present invention is to provide a magnetic head in which a head part is fixed to a ceramic slider, the head part being formed by bringing a pair of magnetic cores face to face so that a magnetic gap may appear on the face confronting a magnetic recording medium, the place where the pair of magnetic cores are brought face to face is constituted by magnetic metal films joined to each other via a solder glass layer to form a gap, said magnetic metal film comprising a Co-containing amorphous alloy, and said solder glass comprising a crystallizable glass in $PbO$-$B_2O_3$-$ZnO$ system having the following composition:

| | |
|---|---|
| PbO | 75~85 wt %, |
| ZnO | 5~10 wt %, |
| $B_2O_3$ | 7~12 wt %, |
| $SiO_2$ | 0.5~2.0 wt %, |
| $K_2O$ | 0.5~1.0 wt %, |
| CuO | 0.5~2.0 wt %, |

The magnetic Co-containing amorphous metal film is deteriorated in magnetic properties when crystallized. The crystallizing temperature is about 550° C.

The joining of the gaps of the magnetic cores and the joining of the head chip cut off from the magnetic core to the non-magnetic ceramic slider must be carried out at a working temperature of about 460° C. or below with all reserve.

An object of the present invention is to provide a glass composition having characteristics such that the working temperature is 460° C. or below, and it is hardly crystallized in the filling operation of glass to the grooves of the magnetic core, while it is crystallized when two magnetic cores filled with glass are joined.

The glass of the present invention is a low temperature softening crystallizable glass composed mainly of PbO and having a viscosity of $10^4$ poise or below at 460° C. (corresponding to the working point of glass). Concrete composition of the glass comprises the following main constituents:

| | |
|---|---|
| PbO | 75~85 wt % |
| ZnO | 5~10 wt % |
| $B_2O_3$ | 7~12 wt % |
| $SiO_2$ | 0.5~2.0 wt % |
| $K_2O$ | 0.5~1.0 wt % |
| CuO | 0.5~2.0 wt % |

The glass having a composition in the above-mentioned ranges has a transition point in the range of 280° C. to 300° C., a point of incipient deformation in the range of 300° C. to 320° C., a softening point in the range of 360° C. to 380° C., a crystallization initiating temperature (corresponding to the temperature of joining operation) in the range of 450° C. to 470° C. and a thermal expansion coefficient of glass after crystallization of $90 \sim 110 \times 10^{-7}/°C$.

The glass of the present invention is extremely preferable for joining a magnetic head, particularly a magnetic head in which a magnetic amorphous metal film is used.

The joining of gaps of the magnetic cores comprises two steps, one of which is a filling operation of glass to a magnetic core and the other is a step wherein two magnetic cores filled with glass are brought face to face and joined. It is necessary to carry out the glass filling operation at a temperature not higher than the crystallization initiating temperature because the magnetic cores can not be joined if the filled glass is crystallized. However, if the filling temperature is too low, the fluidity of the glass deteriorates, resulting in unsatisfactory wetting of glass to the adherent. Therefore, it is necessary to set the temperature for the glass filling operation between the temperature at which glass begins to flow (commonly called the flow point) and the crystallization initiating temperature. Furthermore, in the glass filling operation, it is necessary to maintain the step temperature for at least 10 to 30 minutes for wetting the adherent with glass.

The crystallization initiating temperature of glass of 450° C. to 460° C. mentioned in the present invention is a value obtained when the glass is heated at a rate of 5° C./minutes, while the crystallization is caused even at the temperature of 450° C. or below if it is maintained for a time longer than a fixed time.

FIG. 1 is a graph showing the relation of temperature to crystallization state, and the retention time is 30 minutes. The length of crystallization development of the ordinate axis is a value obtained by observation of total length of crystallization construction developing inside from the glass surface by a light microscope.

As clear from the drawing, in glass ⓑ composed of PbO-ZnO-$B_2O_3$-$SiO_2$, crystal has been developed up to about 200μ from the glass surface when it has been maintained at 420° C. for 30 minutes. On the contrary, in the glass ⓐ of the present invention, crystallization is not caused even when the glass is maintained at 430° C. for 30 minutes.

The above-mentioned glass ⓑ has a softening point of 370° C. and a crystallization initiating temperature (characteristics obtained when heated at a rate of 5° C./minutes) of 430° C., the softening point being the same as that of the glass ⓐ of the present invention while the crystallization initiating temperature is about 40° C. lower than that of the glass ⓐ of the present invention.

The glass of the present invention can be prepared by mixing raw glass materials, putting them in an alumina or platinum crucible, heating and melting them in an electric furnace at 950° C. to 1000° C. for one hour, casting them in a graphite jig (preheating temperature: 150° C. to 200° C.) and cooling them by leaving.

The reason why the compounding proportion of the glass composition of the present invention is limited to that mentioned above is as follows.

Although PbO lowers the softening point of the glass and brings good fluidity thereto, the fluidity deteriorates if it is less than 75% by weight, while the thermal expansion coefficient becomes high if it exceeds 80% by weight.

ZnO contributes to crystallization of glass. Nevertheless, if it is less than 5% by weight, the glass can not be crystallized at a working temperature of 450° C., while if it exceeds 10% by weight, the glass can not be put to practical use because of excess crystallization.

$B_2O_3$ is a glass forming oxide. If it is less than 7% by weight, vitrification of the composition can not be accomplished, while if it exceeds 12% by weight, the fluidity of glass deteriorates and crystallization is imperfect, so that the glass can not be put to practical use.

$SiO_2$ is also a crystallization adjustor. If it is less than 0.5% by weight, it is not effective, while if it exceeds 2% by weight, the glass is hardly crystallized.

$K_2O$ improves the fluidity of the glass. However, if it is less than 0.5% by weight, it is not effective, while if it exceeds 2% by weight, the glass is hardly crystallized and the water resistance of the glass deteriorates.

CuO also improves the fluidity of the glass and is effective for making crystals minute. Nevertheless, if it is less than 0.5% by weight, it is not effective, while if it exceeds 2% by weight, the softening point becomes high and Cu is crystallized.

BRIEF DESCRIPTION OF THE DRAWINGS

FIG. 2 (a) is a perspective view of C-shaped magnetic core and I-shaped magnetic core; FIGS. 2 (b) and (c) are front views of magnetic cores in which a magnetic amorphous metal film and a $SiO_2$ film are formed; FIGS. 2(d), (e), (f) and (g) are front views of magnetic cores in which a glass is filled and $SiO_2$ film is formed; and FIGS. 2 (h) and (i) are front views of magnetic cores joined to each other by glass wherein the following reference characters represent the stated elements:

a—glass of the present invention,
b—glass of Comparative Example,
1—C-shaped magnetic core,
2—I-shaped magnetic core,
3—magnetic amorphous metal film,
4—$SiO_2$ film, 7—low temperature softening crystallizable glass,
8—gap size regulating SiO₂ film,
10—magnetic cores joined by glass,
11—magnetic core chip,
12—non-magnetic ceramic slider,
15—low temperature softening crystallizable glass (the same kind as 7), and
16—composite type magnetic head.

Figure 3:
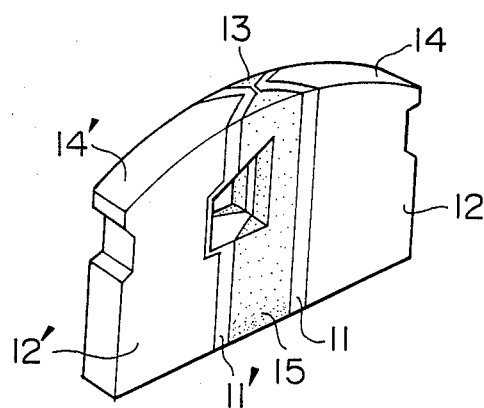

FIG. 3 is a perspective view of a magnetic head of the present invention wherein the following reference characters represent the stated elements:
11, 11'—magnetic metal film,
12, 12'—magnetic core,
13—magnetic gap portion,
14, 14'—face confronting to magnetic recording medium, and
15—solder glass.

DESCRIPTION OF THE PREFERRED EMBODIMENTS

The present invention is described referring to the following Examples.

EXAMPLE 1

Compositions and physical properties of the glass used in the present invention are shown in Table 1.

With regard to the measurement of the physical properties, the softening point and crystallization initiating temperature are measured by using powdered glass by means of an apparatus for differential thermal analysis at a heating rate of 5° C./minute.

The thermal expansion coefficient is measured by usind a test piece obtained by cutting a glass having been crystallized in a size of 5ϕ×20 mm by means of a thermal expansion measuring device.

TABLE 1

|  | ① | ② | ③ | ④ | Conventional glass |
|---|---|---|---|---|---|
| PbO | 78 | 80 | 84.5 | 80 | 80 |
| ZnO | 8 | 8.5 | 4.5 | 9 | 9 |
| B₂O₃ | 12 | 8 | 7.5 | 8 | 9 |
| SiO₂ | 1.0 | 2.0 | 1.0 | 1.0 | 2 |
| K₂O | 1.0 | 0.5 | 0.5 | 0.5 | 0 |
| CuO | 0.5 | 1.0 | 2.0 | 1.5 | 0 |
| Softening temperature (°C.) | 375 | 370 | 365 | 373 | 370 |
| Crystallization initiating temperature (°C.) | 470 | 460 | 450 | 456 | 420 |
| Thermal expansion coefficient[1] (× 10⁻⁷/°C.) | 93 | 102 | 110 | 100 | 100 |

[1]Thermal expansion coefficient after crystallization.

The glass can be filled without crystallization. Furthermore, the joining operation after the glass filling operation can easily be conducted by heating at the crystallization initiating temperature. The thermal expansion coefficient after crystallization is 93–110×10⁻⁷/°C. which is fit for the thermal expansion coefficient of a magnetic head (magnetic core: 110×10⁻⁷/°C.) and ceramic slider (108×10⁻⁷/°C.).

EXAMPLE 2

Figure 1:
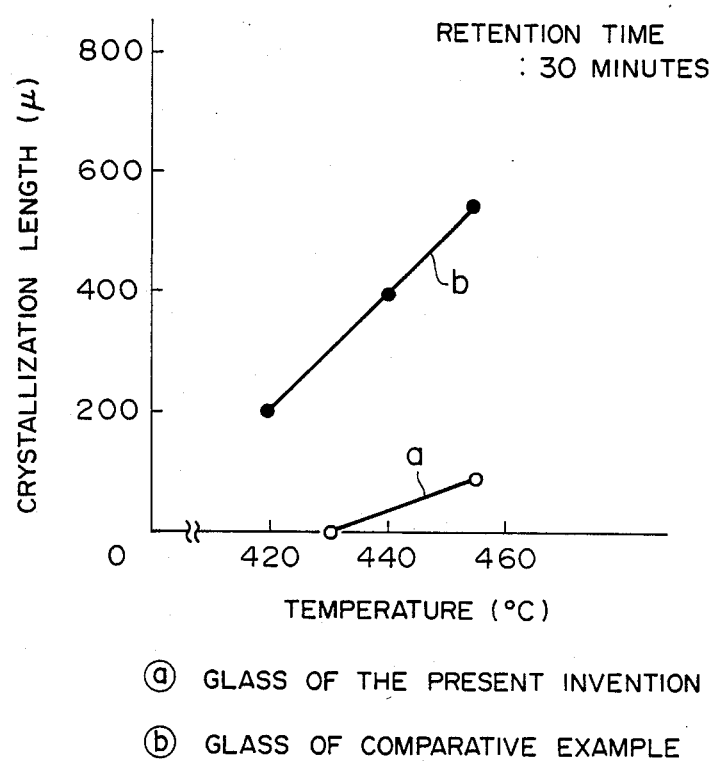
FIG. 1 is a curve showing a relation of temperature on heating the low temperature softening crystallizable glass to devitrifiable length.
Figure 2:
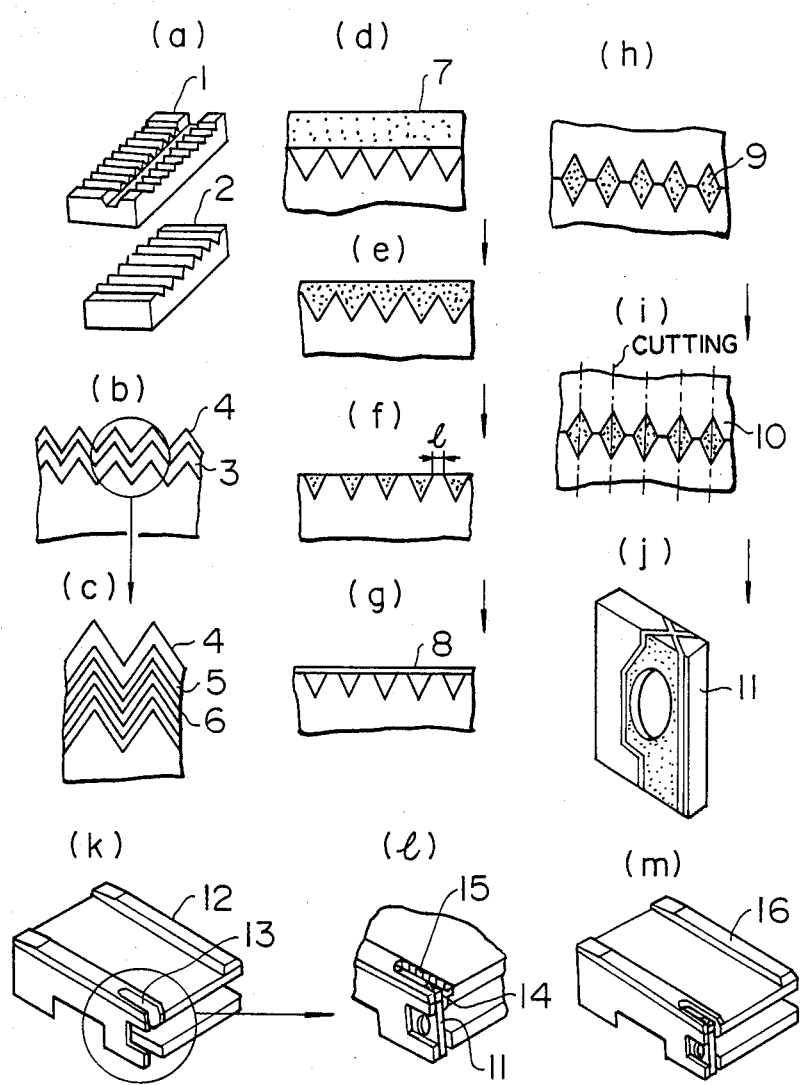
FIG. 2 is a flow chart showing a process for producing a composite type magnetic head.

A process for producing a composite type magnetic head using glass ② in Table 1 is shown in FIG. 2.

A magnetic amorphous metal film (Co-Nb-Zr alloy, thickness of film: 25μ) 3 and SiO₂ (thickness of film: 1μ) 4 are formed on the surfaces of a C-shaped magnetic core and a I-shaped magnetic core which have W-shaped grooves by a sputter method (FIG. 2(b)). The magnetic amorphous metal film mentioned herein is decreased in vortex current loss of the magnetic film by laminating magnetic amorphous metal films (thickness of film: 5μ) 5 and SiO₂ films (thickness of film: 0.05μ) 6 one after another as shown in FIG. 2(c). The magnetic film is a laminate having five layers.

Subsequently, a low temperature softening crystallizable glass (size: 4×15×0.5 t) 7 having a weight proportion of 80% PbO-8.5% ZnO-2% SiO₂-0.5% K₂O-1.0% CuO is put on the surface of the core having the magnetic amorphous metal layer 3 and the SiO₂ film 4 formed thereon (FIG. 2(d)), and heated to 430° C. for 30 minutes, thereby the W-shaped grooves are filled with the glass 7. At this time, the glass 7 is not crystallized yet.

After filling of the glass, the upper surface of the W-shaped grooves is ground to make tracks (FIG. 2 (f)). The track size is about 10μ. After determination of the track size 1, a SiO₂ film (thickness of film: 0.1μ) 8 for regulating the gap size is formed on the upper surface of the W-shaped grooves by sputter method (FIG. 2(g)).

The magnetic cores 1 and 2 having a gap size regulating SiO₂ film formed thereon are joined to each other by bringing their W-shaped groove portions face to face and heating them at 450° C. for 30 minutes (FIG. 2(h)). At this time, the glass 9 is crystallized. After joining by glass, the magnetic core 10 is cut (FIG. 2(i)) to obtain magnetic core chips (FIG. 2(j)).

The obtained magnetic core chip is inserted into a slot 13 of a non-magnetic ceramic slider (CaTiO₃) 12 (FIG. 2(k)) and a glass (size: ϕ0.5×15 l) of the same kind as 7 is put on the space 14 between the magnetic core chip and the non-magnetic ceramic slider 12 and heated at 430° C. for 30 minutes to join the magnetic core chip to the non-magnetic ceramic slider (FIG. 2(l)). After joining by glass, a composite type magnetic head 16 is completed by lapping (FIG. 2(m)).

EFFECT OF THE INVENTION

The magnetic head of the present invention has about 2 times higher recording density than the conventional one as a magnetic head for floppy disk or hard disk because an amorphous alloy is used.

Since a crystallizable glass is used as the glass, there can be obtained a magnetic head having a high strength and superior humidity resistance and reliability.

Further, the glass of the present invention is a low temperature softening crystallizable glass suitable for a solder glass for a magnetic head with high performance for floppy disk and hard disk in which a magnetic amorphous film is utilized and two joining steps are required. Therefore, filling of glass to a magnetic core is made possible without crystallization of glass at a temperature of 430° C. Moreover, crystals are micronized by addition of CuO, so that the glass is excellent in resistance to wear.

What is claimed is:
1. A magnetic head for a hard disk drive capable of being fixed to a ceramic slider, the head part being formed by bringing a pair of magnetic cores face to face so that a magnetic gap is provided at a portion of said magnetic head confronting a magnetic recording medium, and a place where the pair of magnetic cores are brought face to face comprises magnetic metal films joined to each other via a solder glass layer, each of said magnetic metal films comprising a Co-containing amorphous alloy, and said solder glass comprising a crystallizable glass of the $PbO$-$B_2O_3$-$ZnO$ system having the following composition:

| | |
|---|---|
| PbO | 75~85 wt %, |
| ZnO | 5~10 wt %, |
| $B_2O_3$ | 7~12 wt %, |
| $SiO_2$ | 0.5~2.0 wt %, |
| $K_2O$ | 0.5~1.0 wt %, |
| CuO | 0.5~2.0 wt %. |

2. A magnetic head according to claim 1, wherein said magnetic head is fixed to said ceramic slider by another crystallizable glass having the same composition range as the solder glass for joining said magnetic metal.

3. A magnetic head according to claim 2, wherein said crystallizable glass has a thermal expansion coefficient of 90 to $110 \times 10^{-7}/°C$. after it has been crystallized.

4. A magnetic head according to claim 1, wherein said crystallizable glass has a thermal expansion coefficient of 90 to $110 \times 10^{-7}/°C$. after it has been crystallized.

5. A magnetic head according to claim 1, wherein said crystallizable glass has a crystallization initiating temperature in the range of 450° C. to 470° C.

6. A magnetic head according to claim 1, wherein said crystallizable glass has a viscosity of $10^4$ poise or below at 460° C.

7. A magnetic head according to claim 1, wherein said crystallizable glass has a softening point in the range of 360° C. to 380° C.

8. A magnetic head according to claim 1, wherein said place where the pair of magnetic cores are brought face to face comprises magnetic metal films made of a Co-containing amorphous alloy and $SiO_2$ films laminated one after another.

* * * * *